(12) United States Patent
Tu et al.

(10) Patent No.: US 6,876,459 B2
(45) Date of Patent: Apr. 5, 2005

(54) METHOD AND APPARATUS FOR OPTICAL MEASUREMENT OF THE LEADING EDGE POSITION OF AN AIRFOIL

(75) Inventors: Peter Henry Tu, Schenectady, NY (US); Glen William Brooksby, Glenville, NY (US); James Vradenburg Miller, Clifton Park, NY (US); Donald Wagner Hamilton, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 382 days.

(21) Appl. No.: 10/063,228

(22) Filed: Apr. 1, 2002

(65) Prior Publication Data

US 2003/0184767 A1 Oct. 2, 2003

(51) Int. Cl.⁷ .......................... G01B 11/14; G01N 21/86
(52) U.S. Cl. .................................. 356/614; 250/559.36
(58) Field of Search .......... 250/559.19, 559.22–559.29, 250/559.35, 559.36, 559.4; 356/601, 613, 614, 615, 621, 625, 627, 628, 630, 634, 635; 382/141, 152

(56) References Cited

U.S. PATENT DOCUMENTS

| | | | |
|---|---|---|---|
| 4,872,757 A | 10/1989 | Cormack et al. | ........... 356/376 |
| 5,159,361 A | 10/1992 | Cambier et al. | ............ 351/212 |
| 5,867,250 A | 2/1999 | Baron | ........................ 351/212 |
| 6,205,240 B1 * | 3/2001 | Pietrzak et al. | ............. 382/152 |

* cited by examiner

*Primary Examiner*—Zandra V. Smith
*Assistant Examiner*—Gordon J. Stock, Jr.
(74) *Attorney, Agent, or Firm*—Jean K. Testa; Patrick K. Panode

(57) ABSTRACT

Apparatus (10) for determining the leading edge (E) of an airfoil (A) includes a first light source (S1) illuminating a portion of the airfoil including its leading edge and a first camera (M1) acquiring an image of the illuminated portion of the airfoil. A second light source (S2), spaced apart from the first light source, also illuminates a portion of the airfoil including its leading edge. A second camera (M2) acquires an image of the portion of the airfoil illuminated by the second light source. The location (N2) of the second light source and the first camera are coincident in space as are the location (N1) of the first light source and the second camera. An image processor (P) processes the respective images obtained from the two cameras to locate the leading edge of the object. In doing so, the processor utilizes similarities in illumination of the airfoil by the respective light sources and occlusion boundaries of the respective illuminated portions of the airfoil.

9 Claims, 5 Drawing Sheets

METHOD AND APPARATUS FOR OPTICAL MEASUREMENT OF THE LEADING EDGE POSITION OF AN AIRFOIL

BACKGROUND OF INVENTION

This invention relates to light gauging measurement methodologies and, in particular, to a method and apparatus for locating (reconstructing) the leading edge of an object such as an airfoil or the like. In aerodynamic structures such as airfoils, the majority of the performance characteristics of the structure are dictated by the characteristics (shape, contour, etc.) of the leading edge of the airfoil. Accordingly, in testing an airfoil to determine if it is manufactured to the proper specifications, accurately determining the location and shape of the leading edge is extremely important.

As shown in FIG. 1, an airfoil A has a leading edge E. A prior art test configuration for determining location of the leading edge employs a structured light sensor used to measure the position of the thin surface presented by the leading edge of the airfoil. In this setup, structured light from the sensor replaces the laser stripe typically used with a positional light source. This results in a linear highlight (the thin strip H) extending the length of the airfoil at its leading edge. The image of the edge highlight has properties similar to those of an image of a laser stripe over a smooth surface. This highlight can be processed using algorithms similar to those used to detect a laser stripe in a standard structured light test arrangement, so to locate points along the leading edge. One technique employed in this regard uses triangulation. Here, points on the edge are located by processing multiple images of the object taken using cameras located in different positions.

A problem with this approach is that if the cameras used to capture the images are placed indiscriminately, the triangulated positions will be biased. This is because when imaging a thin structure to determine an edge of it, various optical and imaging effects must be taken into consideration. For example, the angle of incidence of light from a source onto the surface of the object, occlusion boundaries, and illumination boundaries can produce an erroneous result so that the calculated location of the leading edge significantly differs from its true location. This can result in an acceptable airfoil being rejected, or an unacceptable airfoil passing. It is important therefore to provide an imaging system and test method which provides accurate leading edge location information.

SUMMARY OF INVENTION

Briefly stated, the present invention is useful in determining the leading edge of an airfoil and includes a first light source illuminating a portion of the airfoil including the leading edge. A first camera acquires an image of the portion of the airfoil illuminated by the first light source. A second light source, spaced apart from the first light source, also illuminates a portion of the airfoil including its leading edge, and a second camera acquires an image of the portion of the airfoil illuminated by the second light source. The second light source and the first camera are co-located (coincident) in space, or as nearly so as practical, as are the locations of the first light source and the second camera. An image processor processes the respective images obtained by the two cameras to locate the leading edge of the object. By co-locating the first light source and second camera and co-locating the second light source and first camera corresponding angles of incidence and reflection in light transmitted by the respective light sources and received by their associated cameras is provided. Also provided are substantially identical regions of mutual illumination and observation. This eliminates bias and minimizes reconstruction errors by the processor. The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
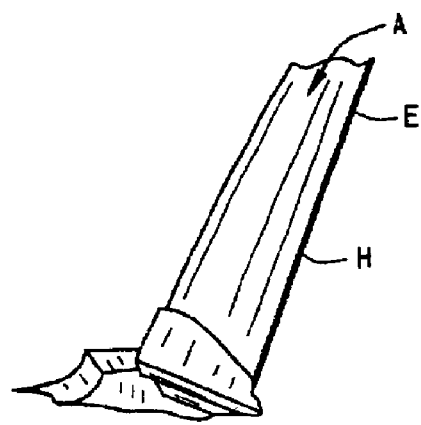
FIG. 1 illustrates a portion of an airfoil with the leading edge of the airfoil being highlighted.
Figure 2A:
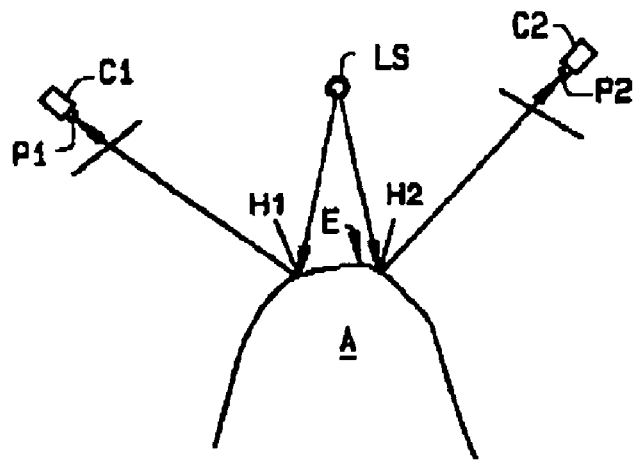
FIG. 2A illustrates a prior art illumination system employing a single light source illuminating the object and multiple cameras.
Figure 2B:
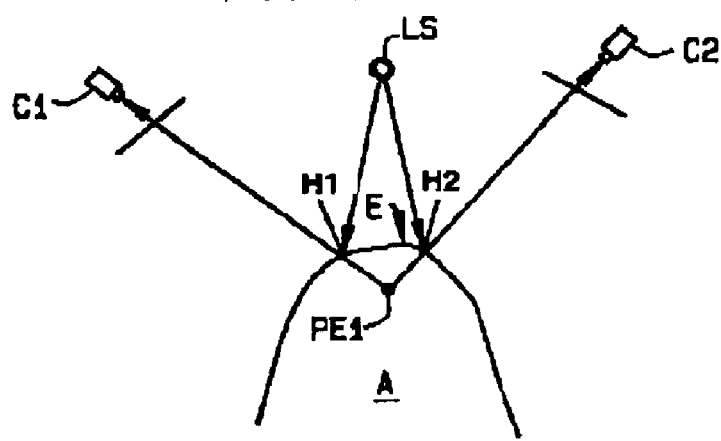
FIG. 2B illustrates the reconstructed position of the leading edge of the airfoil using angle of incidence information obtained using the test setup of FIG. 2A.
Figure 2C:
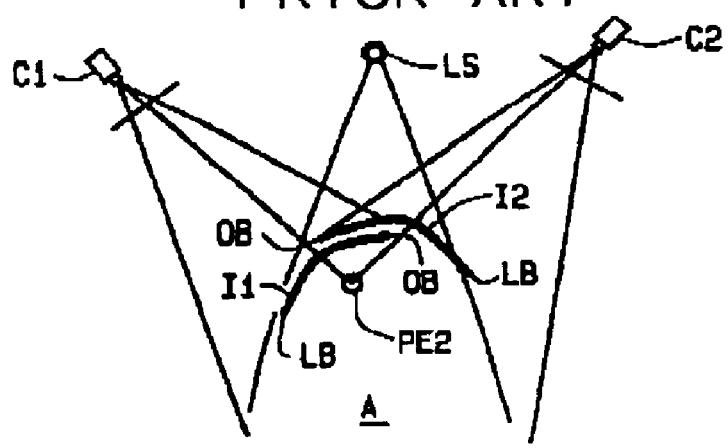
FIG. 2C illustrates the reconstructed leading edge location using occlusion information derived using the test setup of FIG. 2A.

Referring to the drawings, FIG. 2A illustrates a prior art testing arrangement in which a light source LS is positioned at some distance from the airfoil. When in operation, the light source illuminates a portion of the airfoil including its leading edge E. A pair of cameras C1, C2 are located apart from each other at respective positions P1, P2. One camera is positioned to one side of the airfoil, and the other camera is located on its opposite side. The light source is located between the cameras. In FIGS. 2B and 2C, various effects caused by this arrangement are shown. First, in FIG. 2B, a first highlight H1 is produced by the light striking the airfoil's surface, as viewed by camera C1. A second highlight H2 is also produced by light striking the airfoil's surface, as viewed by camera C2.

As shown in FIG. 2C, each camera C1, C2 images a different portion of the surface of the airfoil illuminated by light source LS. The illuminated portion of the airfoil imaged by camera C1 is indicated I1 in FIG. 2C, and that imaged by camera C2 is indicated I2. A lighting boundary LB of each observable image is created where the light from source LS no longer illuminates the airfoil surface, even though a non-illuminated portion of the surface is viewed by a camera. An occlusion boundary OB of each image is created where the contour of the airfoil extends beyond the line-of-sight of a camera.

When the images observed by the respective cameras are now processed to determine where leading edge E of airfoil is located, a position PE1 or PE2 is determined, for each point along the length of the airfoil. Because of the bias sources discussed above, the respective positions are shown to be a) not on the surface of the airfoil, and b) not congruent with each other.

Figure 3A:
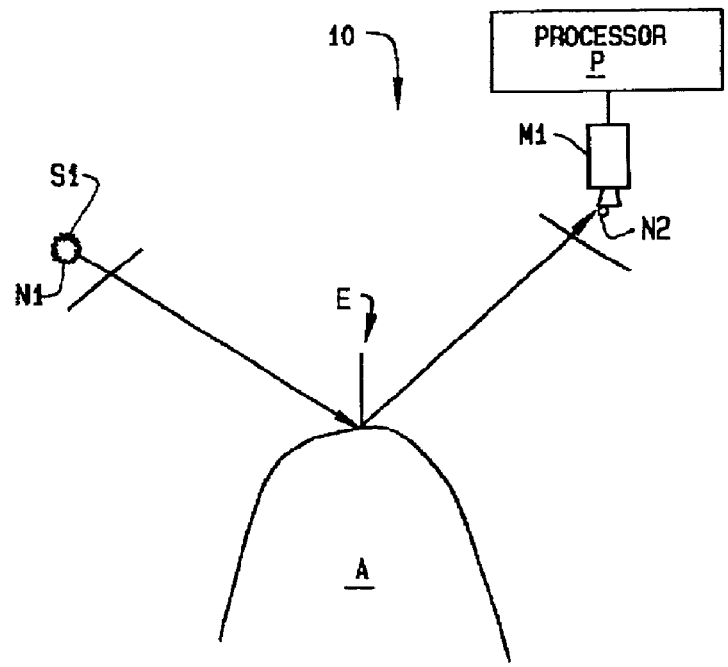
FIGS. 3A and 3B illustrate the apparatus of the present invention for illuminating the airfoil using two separate light sources and two cameras.
Figure 3B:
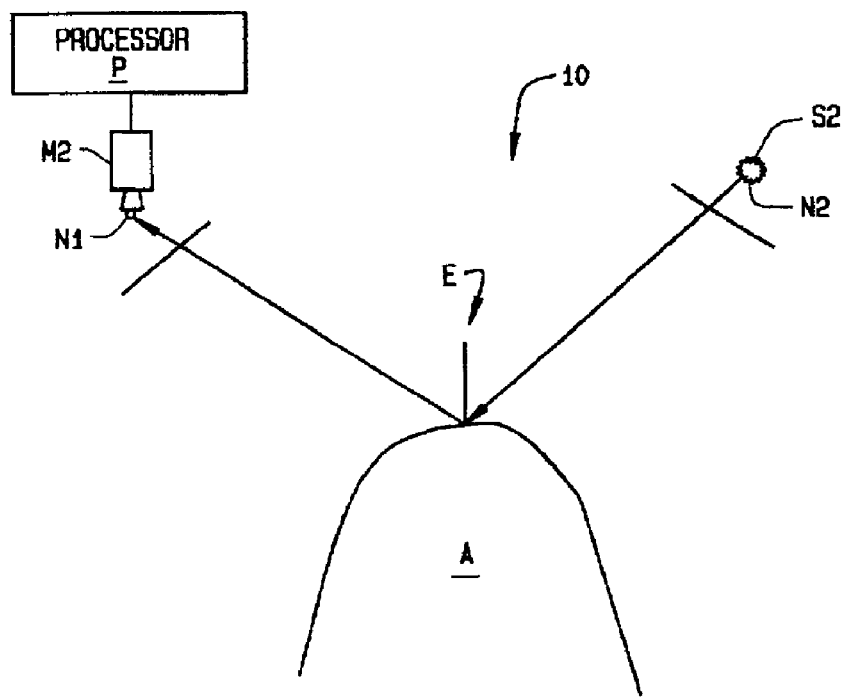

In accordance with the present invention, apparatus for determining the leading edge E of an object such as airfoil A is indicated generally 10 in FIGS. 3A and 3B. The apparatus comprises a first light source S1 shown in FIG. 3A as illuminating a portion of the airfoil including its leading edge. A first imaging means M1 obtains an image of a portion of the airfoil illuminated by light source S1. Next, a second light source S2 is shown in FIG. 3B as illuminating another portion of the airfoil, also including the leading edge of the airfoil. A second imaging means M2 obtains an image of the portion of the airfoil illuminated by light source S2.

It is a feature of the apparatus that the respective light sources S1 and S2 are spaced apart from each other, as are the respective imaging means M1 and M2. Importantly, light source S1 and imaging means M2 are co-located in space. That is, their positions are coincident (or as nearly so as practical). This is as shown in FIGS. 2A and 2B, where both light source S1 and imaging means M2 are located at the same position N1 in space. In addition, light source S2 and imaging means M1 are also co-located (coincident) in space. As again shown in FIGS. 3A and 3B, both light source S2 and imaging means M1 are located at a position N2. It will be appreciated that the respective imaging means, which are cameras operating in the visible portion of the light spectrum, and their co-located light sources, can be conveniently installed or mounted in a common fixture (not shown). This has the advantage of allowing both the camera and light source to be conveniently moved from one location to another during the setup and calibration of the test equipment.

Each camera M1, M2 is connected to a processing means P which comprises an image processor. The respective images obtained from the imaging means are processed by processor P to reconstruct (locate) leading edge E of the airfoil. In this regard, the above described test configuration has the advantage of substantially eliminating biases which exist with prior art lighting and imaging arrangements. Accordingly, while processor P utilizes similarities in illumination of airfoil A by light sources S1 and S2 and the occlusion boundaries of the respective illuminated portions of the airfoil to locate its leading edge, co-location of light source S2 and camera M1 and light source S1 and camera M2 produces corresponding angles of incidence and reflection in light transmitted by the respective light sources and received by their associated imaging means, and substantially identical regions of mutual illumination and observation. This eliminates bias and minimizes reconstruction errors by processor P in reconstructing the leading edge of the airfoil. As shown in FIG. 4C, a reconstructed leading edge position PE3, based upon image processing by processor P, is both on the outer surface of the airfoil, and substantially at the actual location of the leading edge at that point along the length of the airfoil.

Figure 4A:
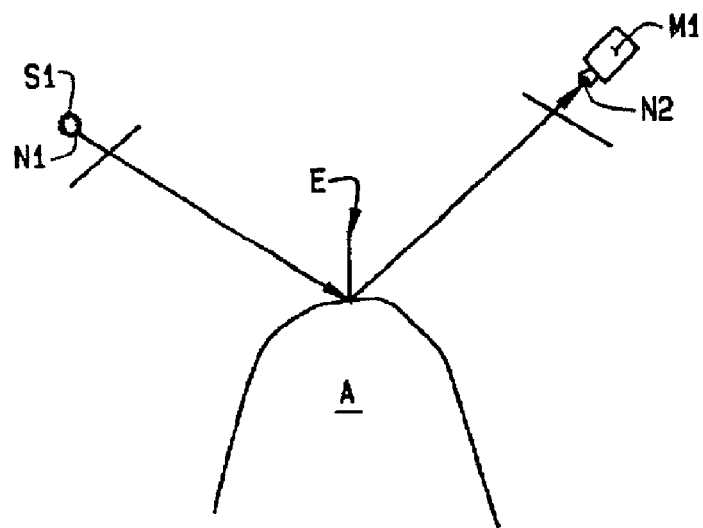
FIGS. 4A and 4B illustrate how leading edge information is obtained using the respective angles of incidence with the two light sources.
Figure 4B:
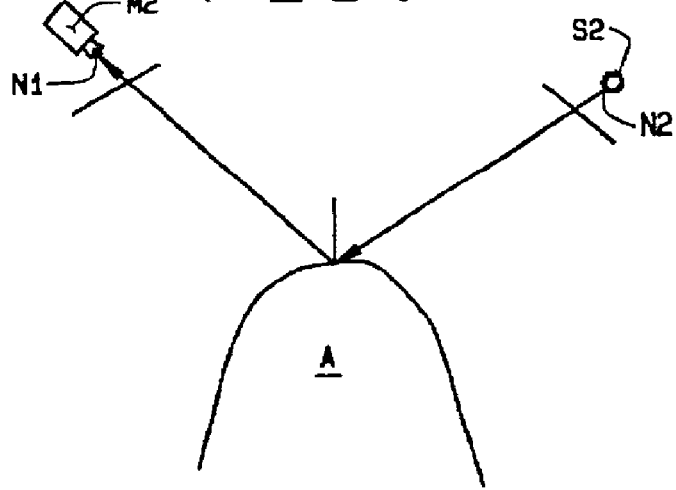
Figure 4C:
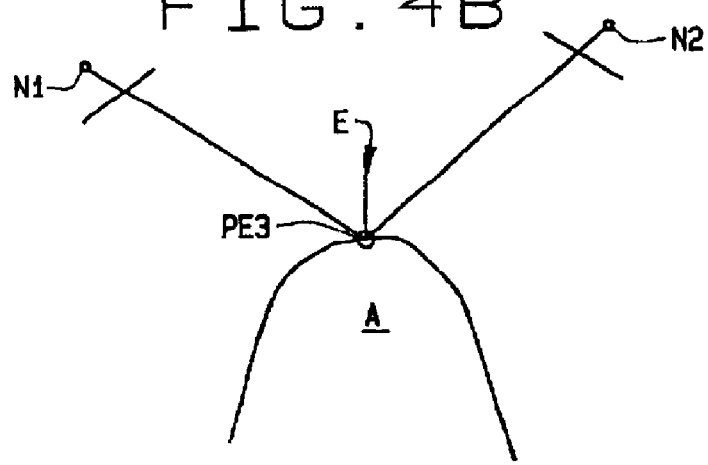
FIG. 4C illustrates a reconstructed leading edge location using angle of incidence with the test setup of FIGS. 3A and 3B; and, FIGS. 5A and 5B illustrate respective regions of illumination and observation for each light source/camera combination using the respective test configurations of FIGS. 3A and 3B.

Referring to FIGS. 4A–4C, the effect of co-location of cameras and light sources in accordance with the present invention is shown with respect to the angle of incidence of the light emitted by the respective sources and received by the respective cameras. Since there are now common locations for both the light sources and camera, there is substantially no difference (i.e., bias) between one light source and its associated camera and the other light source and its associated camera. That is, the angles of incidence and reflection of the light transmitted between the sources and their associated cameras are essentially the same.

Figure 5A:
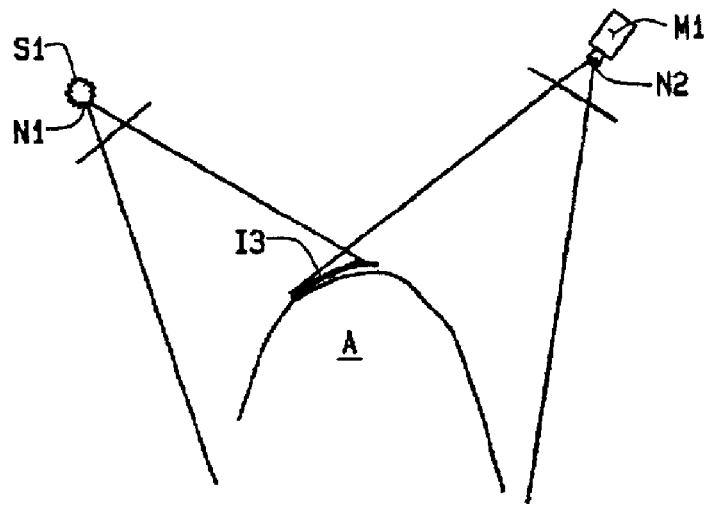
FIG. 5C illustrates that the respective regions are mutual.
Figure 5B:
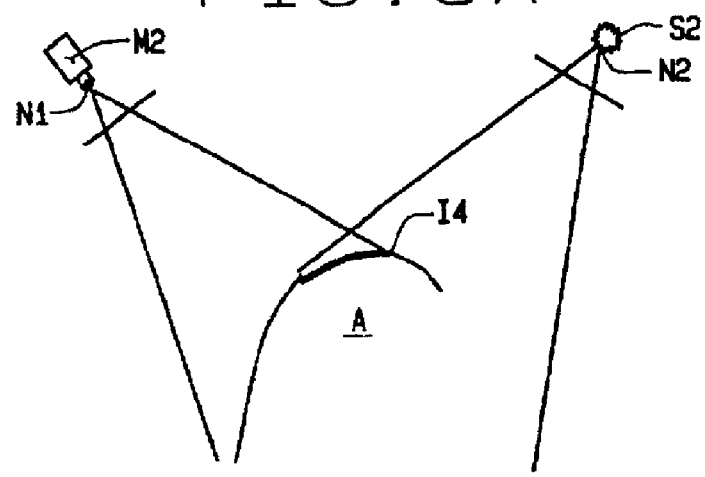
Figure 5C:
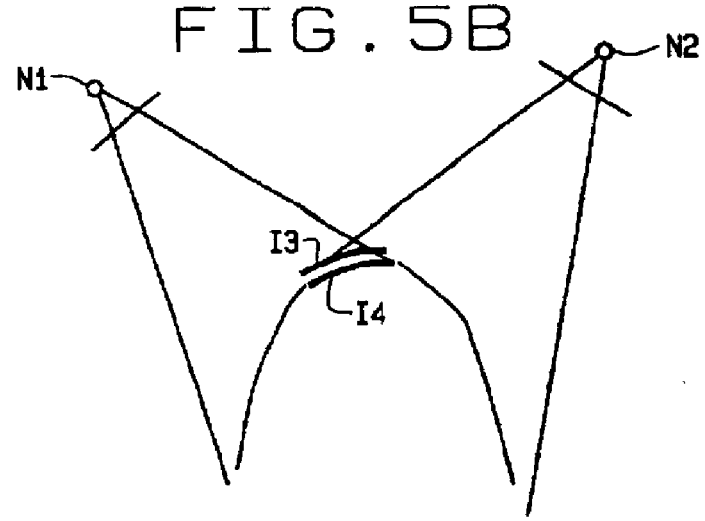

In FIGS. 5A–5C, the effect of the apparatus and method of the present invention on eliminating occlusion effects is shown. In FIG. 5A, a region of mutual illumination and observation produced with light source S1 and imaging means M1 is indicated I3. In FIG. 5B, a similar region I4 is shown to be produced with use of light source S2 and imaging means M2. Importantly, and as shown in FIG. 5C, when the two regions I3 and I4 are compared to each other, they are shown to be substantially identical. This is important because these identical regions of mutual illumination and observation minimize reconstruction errors when the respective images are processed by processor P to calculate the leading edge location PE3 shown in FIG. 4C.

Those skilled in the art will understand that an experimental setup can be established in which the respective co-located light sources and cameras are moved about and images acquired and processed to minimize the previously described biases and produce the most accurate results. It will further be understood that a particular set of locations established for testing one airfoil model may need to be changed for testing a different model. However, with the optimal lighting locations determined, the resulting reconstructed leading edge profile is highly accurate when compared with the actual leading edge profile.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. Apparatus (10) for locating the leading edge (E) of an object (A) comprising:

a first light source (S1) illuminating a portion of the object including its leading edge;

a first imaging means (M1) obtaining an image of the portion of the object illuminated by the first light source;

a second light source (S2) spaced apart from the first light source and also illuminating a portion of the object including its leading edge;

a second imaging means (M2) spaced apart from the first imaging means and obtaining an image of a portion of the object including its leading edge; and, processing means (P) processing the respective images obtained by the first and second imaging means to reconstruct the leading edge of the object and establish its location, wherein the position of the first light source (S1) and the second imaging means (M2) are co-located in space so to be coincident with each other as is the position of the second light source (S2) and the first imaging means (M1), thereby for the processing means (P) to utilize similarities in illumination of the object by the respective light sources and regions of mutual illumination and observation of the object to reconstruct the leading edge (E) of the object (A).

2. The apparatus of claim 1 in which co-location of the first light source (S1) and the second imaging means (M2) and co-location of the second light source (S2) and the first imaging means (M1) provides corresponding angles of incidence and reflection in light transmitted by the respective light sources and received by their associated imaging means, and substantially identical regions of mutual illumination and observation, thereby to eliminate bias and minimize reconstruction errors by the processing means.

3. The apparatus of claim 1 in which the first and second imaging means (M1,M2) each comprise cameras operating in the visible portion of the light spectrum.

4. Apparatus (10) for determining the leading edge (E) of an object (A) comprising:
  a first light source (S1) illuminating a portion of the object including its leading edge;
  a first imaging means (M1) for obtaining an image of the portion of the object illuminated by the first light source;
  a second light source (S2) spaced apart from the first light source and also illuminating a portion of the object including its leading edge, the second light source and the first imaging means being co-located in space coincident with each other;
  a second imaging means (M2) spaced apart from the first imaging means for obtaining an image of a portion of the object including its leading edge, the first light source and second imaging means also being co-located in space coincident with each other; and,
  a processing means (P) processing the respective images obtained from the first and second imaging means, the processing means configured to reconstruct the leading edge of the object utilizing
    (a) similarities in illumination of the object by the respective light sources and occlusion boundaries of the respective illuminated portions of the object to reconstruct the leading edge,
    (b) co-location of the first light source and the second imaging means and co-location of the second light source and the first imaging means producing corresponding angles of incidence and reflection in light transmitted by the respective light sources and received by their associated imaging means, and substantially identical regions of mutual illumination and observation, thereby eliminating bias and minimizing errors by the processing means in reconstructing the leading edge of the object.

5. The apparatus of claim 4 in which the first and second imaging means (M1,M2) are cameras operating in the visible portion of the light spectrum.

6. A method of locating the leading edge (E) of an object (A) comprising:
  separately illuminating the object with a first light source (S1) and a second light source (S2), the two light sources being spaced apart from each other, and the respective light sources illuminating respective portions of the object with each illuminated portion including the leading edge of the object;
  obtaining an image of the portion of the object illuminated by the first light source with a first imaging means (M1), and obtaining an image of the portion of the object illuminated by the second light source with a second imaging means (M2), wherein the first light source (S1) and the second imaging means (M2) are co-located in space so to be coincident with each other, and in which the second light source (S2) and the first imaging means (M1) are also co-located in space so to be coincident with each other, co-location of the first light source and the second imaging means and co-location of the second light source and the first imaging means producing corresponding angles of incidence and reflection in light transmitted by the respective light sources and received by their associated imaging means, and substantially identical regions of mutual illumination and observation, thereby to eliminate bias and minimize errors in the processing of the images of the object and the reconstruction of the leading edge of the object; and,
  processing the respective images to locate the leading edge of the object.

7. The method of claim 6 in which processing the respective images to locate the leading edge of the object includes utilizing similarities in illumination of the object by the respective light sources, and occlusion boundaries of the respective illuminated portions of the object.

8. The method of claim 6 in which the respective imaging means (M1,M2) comprise cameras operating in the visible portion of the light spectrum.

9. A method of locating the leading edge (E) of an object (A) comprising:
  separately illuminating the object with a first light source (S1) and a second light source (S2), the two light sources being spaced apart from each other, and the respective light sources illuminating respective portions of the object with each illuminated portion including the leading edge of the object;
  obtaining an image of the portion of the object illuminated by the first light source with a first imaging means (M1), and obtaining an image of the portion of the object illuminated by the second light source with a second imaging means (M2);
  co-locating the first light source and the second imaging means at a coincident point (N1) in space, and co-locating of the second light source and the first imaging means at another coincident point (N2) in space; and,
  processing the respective images to reconstruct the leading edge of the object, co-location of the first light source and the second imaging means and co-location of the second light source and the first imaging means producing corresponding angles of incidence and reflection in light transmitted by the respective light sources and received by their associated imaging means, and substantially identical regions of mutual illumination and observation, thereby to eliminate bias and minimize errors in the processing of the images of the object and the reconstruction of the leading edge of the object.

* * * * *